Inventor:
James E. Beggs,
by Merton D. Morse
His Attorney.

Patented Oct. 25, 1949

2,486,101

UNITED STATES PATENT OFFICE 2,486,101

METHOD OF MAKING GLASS-TO-METAL SEALS

James E. Beggs, Schenectady, N. Y., assignor to General Electric Company, a corporation of New York Application March 1, 1946, Serial No. 651,233

2 Claims. (Cl. 49—81)

My invention relates to methods of making glass-to-metal seals and particularly to improved methods of making such seals which are particularly adapted for mass production by a continuous process.

In known methods of making glass-to-metal seals the parts have been supported in a lathe or have been supported in a fixture which comes in contact with the glass or which is pressed against the glass during the sealing operation. In accordance with my improved method, the metal parts to be joined by the glass are supported in a fixture in final position and the glass part is supported from the metal parts in such a manner that at no time during the sealing process does it come in contact with the fixture. Preferably the glass and metal parts are formed in such a manner that a section of glass of reduced thickness engages with at least one of the metal parts so that this portion reaches a fluid state during the sealing process and is drawn by surface tension into the sealing region between the glass and the metal. Also, in some cases it is desirable that one or more of the parts be formed with flanges or projections which tend to prevent the glass from settling against the mold when it settles into the final sealing position.

It is an object of my invention to provide a new and improved method of making glass-to-metal seals.

It is another object of my invention to provide a new and improved method of making glass-to-metal seals in which the glass at no time during the sealing process comes in contact with any part other than the parts to be sealed together.

It is another object of my invention to provide a new and improved method of making glass-to-metal seals in which the glass is supported solely from the members to which it is to be sealed.

It is a still further object of my invention to provide a new and improved method of making glass-to-metal seals which is particularly adapted for carrying out by continuous process in a high temperature oven.

Figure 1:
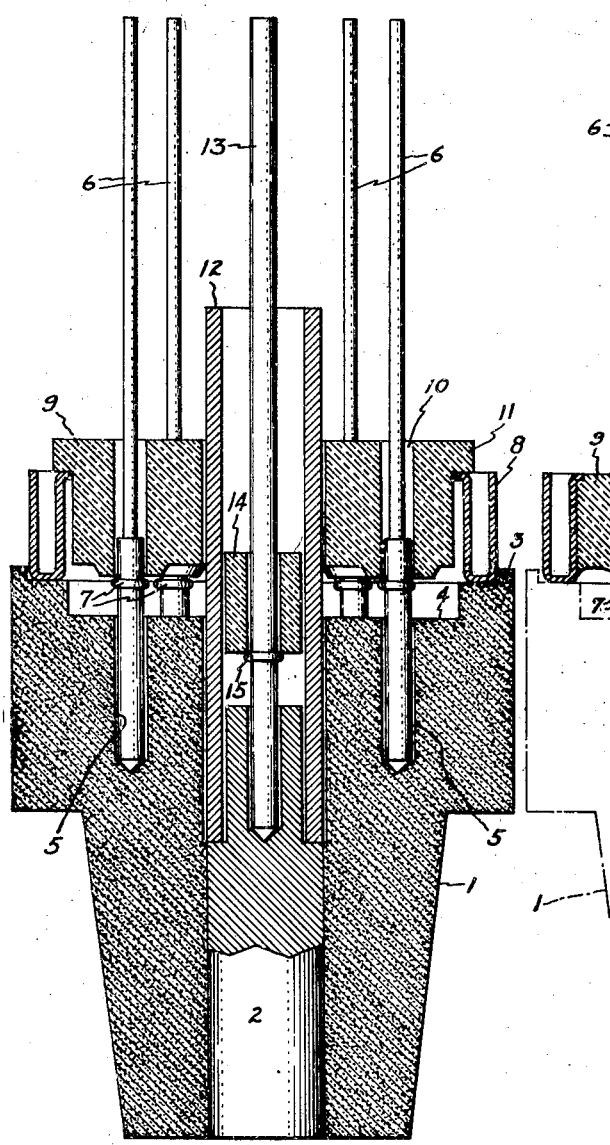
Figure 2:
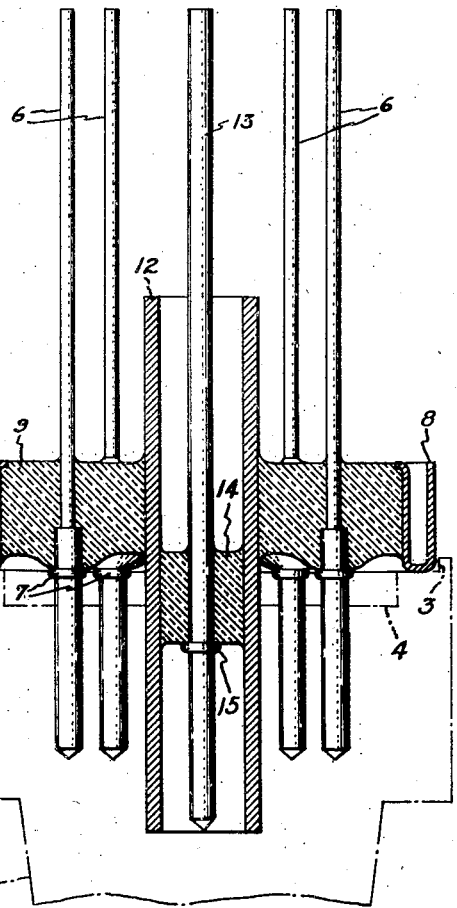
Figure 3:
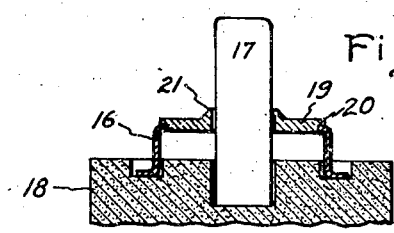

Other objects and advantages of my invention will become apparent as the following description proceeds, reference being had to the accompanying drawing, and its scope will be pointed out in the appended claims. In the drawing, Fig. 1 is an elevational view showing the parts of a glass-to-metal seal assembled in a fixture in accordance with my invention; Fig. 2 shows the completed seal assembly produced by my improved method, and Fig. 3 illustrates parts of a seal formed and assembled in accordance with my invention.

As illustrating an application of my invention, I have shown it applied to the manufacture of a header for electric discharge devices. In Fig. 1 of the drawing, the various parts of a header construction having parts formed in accordance with my method are assembled in a fixture which may have a graphite body 1 and a metal insert 2 positioned within a centrally located bore. The upper face of the fixture is provided with counterbores 3 and 4 and a plurality of cylindrical openings 5 arranged in a circular array about the central bore within which the insert 2 is received. The lead-in conductors and terminal prongs 6 of the header construction are supported with the lower ends received in the openings 5. Each of the members 6 is provided with a flange or upset portion 7 which, as will become apparent as the description proceeds, limits the downward movement of the glass during the sealing operation. The marginal portion of the header is provided by a U-shaped metal channel 8 which is received within the counterbore 3. The main body of glass 9 for the header is in the form of an annular glass punching having a plurality of openings 10 for receiving the lead-in conductors 6 and with an outwardly projecting flange 11 which supports the annular member 9 from the upper edge of the channel member 8. The header also includes a hollow cylindrical lead-in conductor 12 which is centrally located and received within an opening in the body of glass 9. The conductor 12 is supported in desired relation with the remainder of the parts from the insert 2 of the fixture. A further lead-in conductor 13 is positioned centrally within the hollow conductor 12 and arranged to be sealed therein by an annular body of glass 14 which is supported on the lead-in conductor 13 by an upset portion or flange 15. It will be noted from Fig. 1 that the lower portion of the glass body 9 rests above the upset portion 7 so that the glass body may settle under the action of gravity when the supporting edge 11 thereof becomes softened.

I have found that seals of the character described above, utilizing a soft glass for the glass parts and a copper-clad iron for the metal parts, may be successfully made by placing the fixture in an oven maintained at a temperature of approximately 800° C. for a period of several minutes determined by the dimensions of the parts, and then placing in an annealing oven for about fifteen minutes, after which the temperature is allowed to decrease gradually to room temperature. I have found that the period of heating may be timed by ordinary timing equipment so that the process may be carried out readily by placing the fixtures on a conveyor and simply passing them through an oven at a rate which leaves them in the high temperature zone for the required period of time. The conveyor may then pass through an annealing oven and a further region in which the seals are allowed to cool to room temperature.

In Fig. 2 the completed seal is shown. In this figure the same reference numerals employed in connection with Fig. 1 have been applied to corresponding parts. During the heating in the high temperature oven all parts reach substantially the same temperature and the glass body becomes fluid and a part thereof is drawn into the small spaces between the openings in the glass body and the metal parts. The flange 11 becomes fluid and is drawn by surface tension into the space between the glass body 9 and the inner surface of the annular member 8. If additional glass is desired in the region of the seal between the hollow central conductor 12, a small upwardly extending rib may be provided on the glass blank on the inner edge thereof. It will be noted from the position of the parts in Fig. 2 that the glass has settled into the metal parts and engages the upset parts on the lead-in conductors but that in no place has the glass touched the fixture.

In Fig. 3 I have shown the parts of a modified seal construction shaped and assembled in accordance with my method. As illustrated, the metal parts including a ring-like flange member 16 and a central thimble-like conductor 17 are supported from a fixture 18. A glass body 19 in the form of an annular disk is supported from the upper end of the member 16 by flange 20 of reduced thickness. In order to insure that the glass seals to conductor 17, I provide a raised bead 21 on the glass body adjacent the outer surface of conductor 17. I have found this particularly desirable in constructions employing a glass body which is relatively thin as compared with the minimum unsupported dimension of the glass body which in the illustrated embodiment is the width of the annular body mounted on a radius thereof. It will be understood that as the parts are heated the glass body is melted and settles into position in the same manner as described in connection with the construction of Figs. 1 and 2.

In accordance with my method as illustrated by the two examples, the metal parts are supported in fixed position and the glass body, or bodies, supported therefrom. The shape and dimensions of the parts are chosen so that the glass body melts and seals to all the metal surfaces without sagging into contact with the fixture. This eliminates sticking to the fixture and permits the seals to remain in the fixtures during the annealing process. Methods embodying my invention have the advantage that a large number of individual glass-to-metal seals may be simultaneously completed.

While I have shown and described particular embodiments of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. The method of forming a header including a body of glass, a surrounding metal member and a plurality of lead-in conductors which comprises the steps of forming projections on the lead-in conductors, supporting the lead-in conductors in a fixture with said projections above the surface of the fixture, supporting the metal member from the fixture, supporting the glass body from the metal member by a flange of less thickness than the remainder of the glass body with said lead-in conductors received in openings in said body, and heating the assembly to melt the flange and allow the glass body to settle into engagement with the projections.

2. The method of sealing an apertured glass body to a metal member received within the aperture and a surrounding metal member which comprises the steps of supporting the metal parts in a fixture in the relative positions occupied in the complete seal, supporting the glass body from the surrounding metal member by a flange of reduced thickness, providing a bead on the body of glass around the aperture to insure that the glass body seals to the metal member in the aperture, and heating the assembly until the glass body melts and settles into sealing relation with the metal member.

JAMES E. BEGGS.

REFERENCES CITED

The following references are of record in the file of this patent:

FOREIGN PATENTS

| Number | Country | Date |
|---|---|---|
| 2,078,776 | Ruggles | Apr. 27, 1937 |
| 2,125,315 | Ronci | Aug. 2, 1938 |